April 30, 1963  N. C. NITSCHKE ETAL  3,087,316
AUTOMATIC GLASS BENDING AND TEMPERING FURNACE
Filed Oct. 5, 1959  11 Sheets-Sheet 3
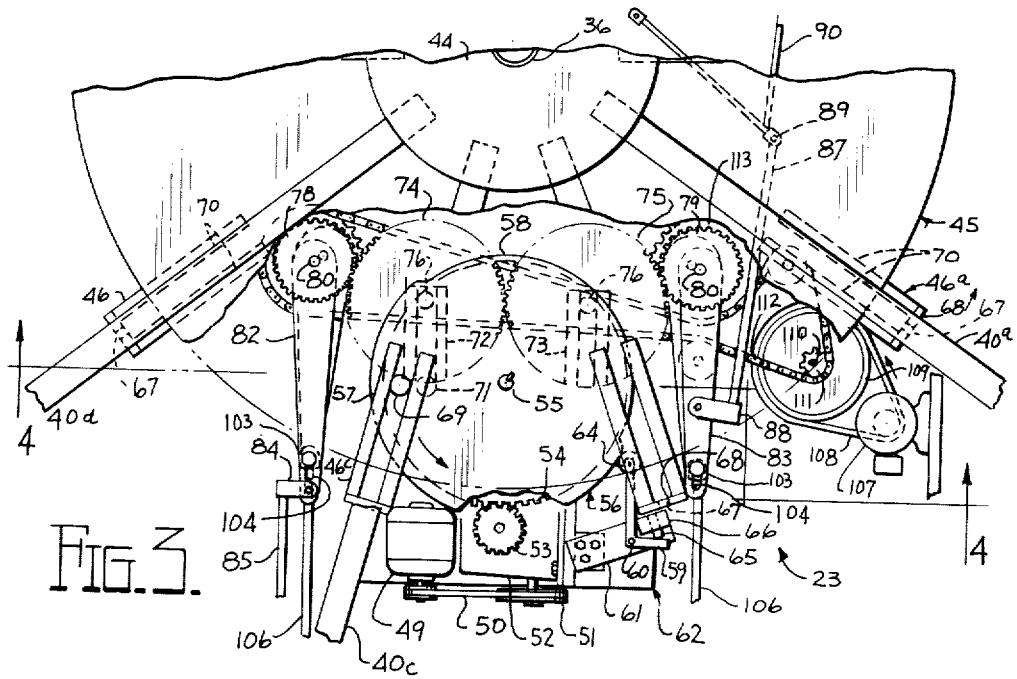
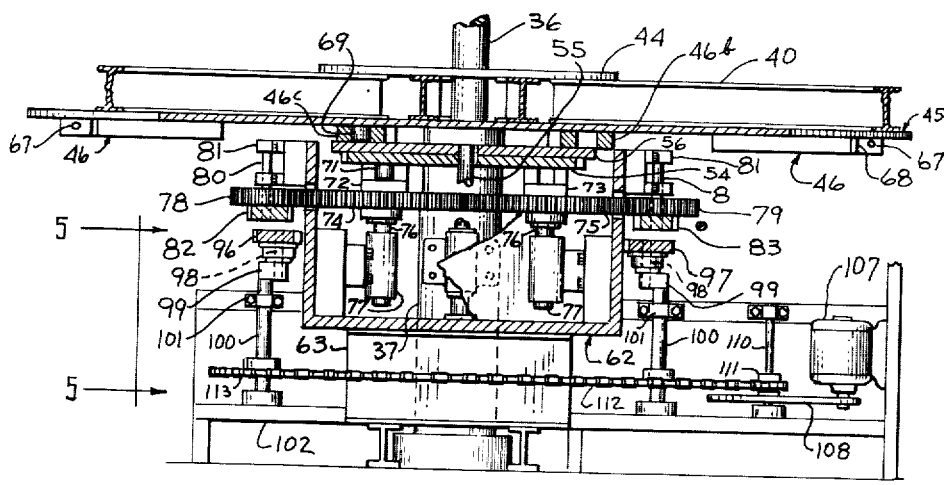
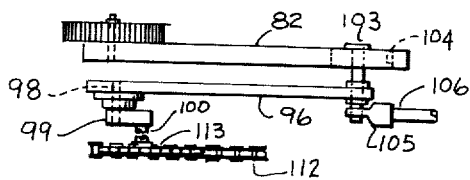
INVENTORS
NORMAN C. NITSCHKE
BY HAROLD A. McMASTER
Owen + Owen
ATTORNEYS INVENTORS
NORMAN C. NITSCHKE
HAROLD A. McMASTER
BY Owen & Owen
ATTORNEYS April 30, 1963 N. C. NITSCHKE ETAL 3,087,316
AUTOMATIC GLASS BENDING AND TEMPERING FURNACE
Filed Oct. 5, 1959 11 Sheets-Sheet 6

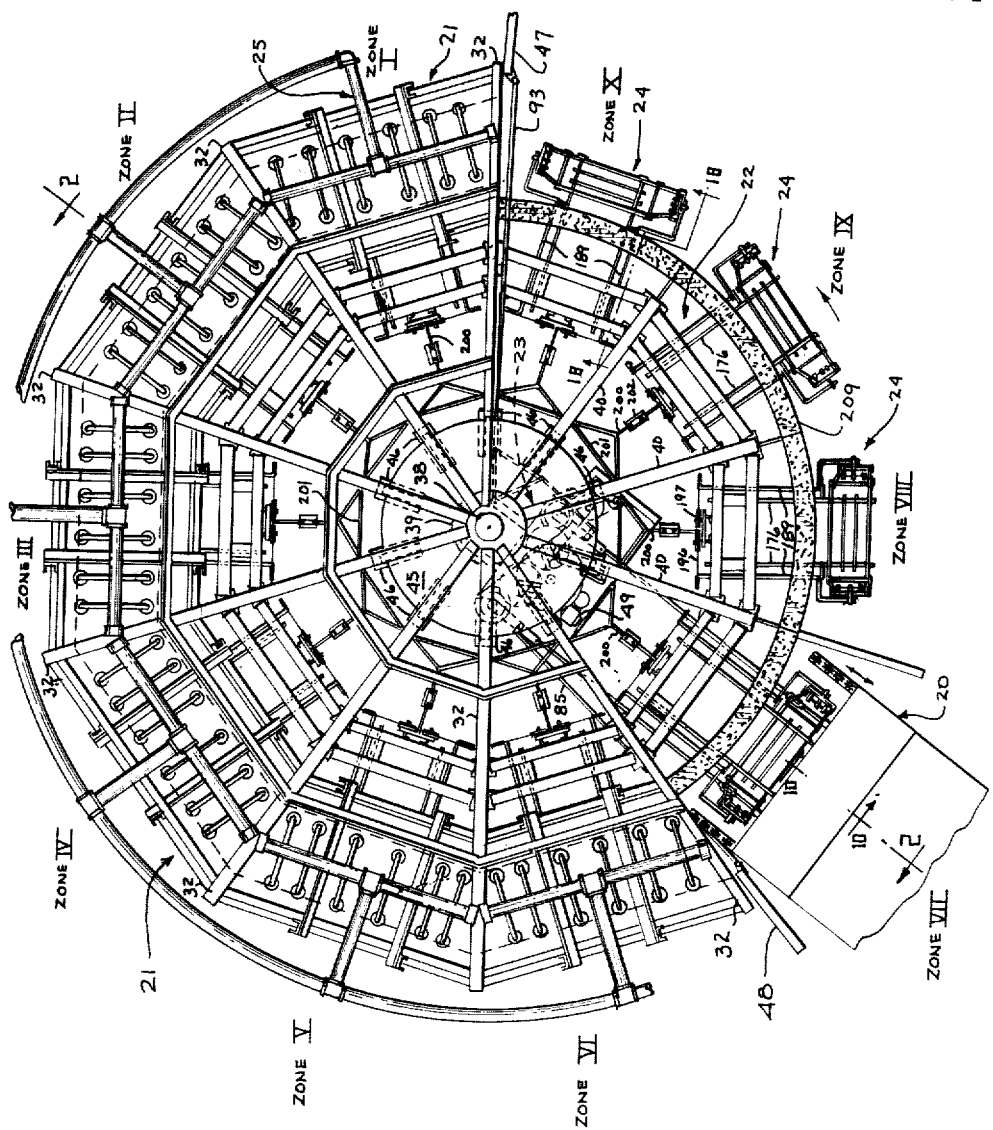

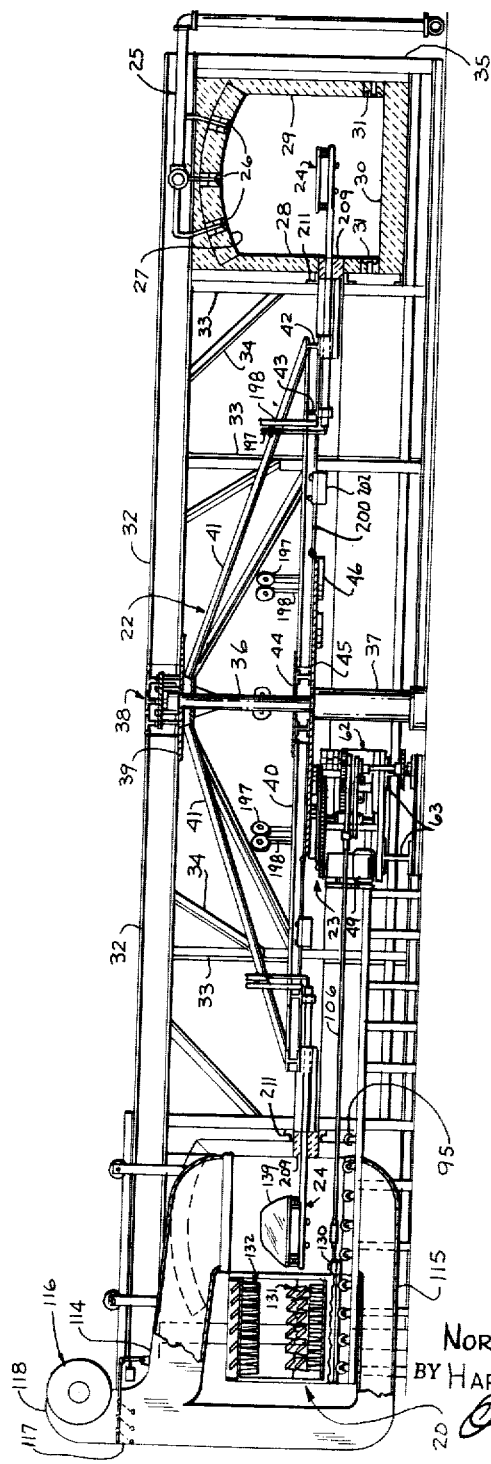

INVENTORS
NORMAN C. NITSCHKE
BY HAROLD A. McMASTER

Owen & Owen
ATTORNEYS

INVENTORS
NORMAN C. NITSCHKE
BY HAROLD A. McMASTER
Owen + Owen
ATTORNEYS

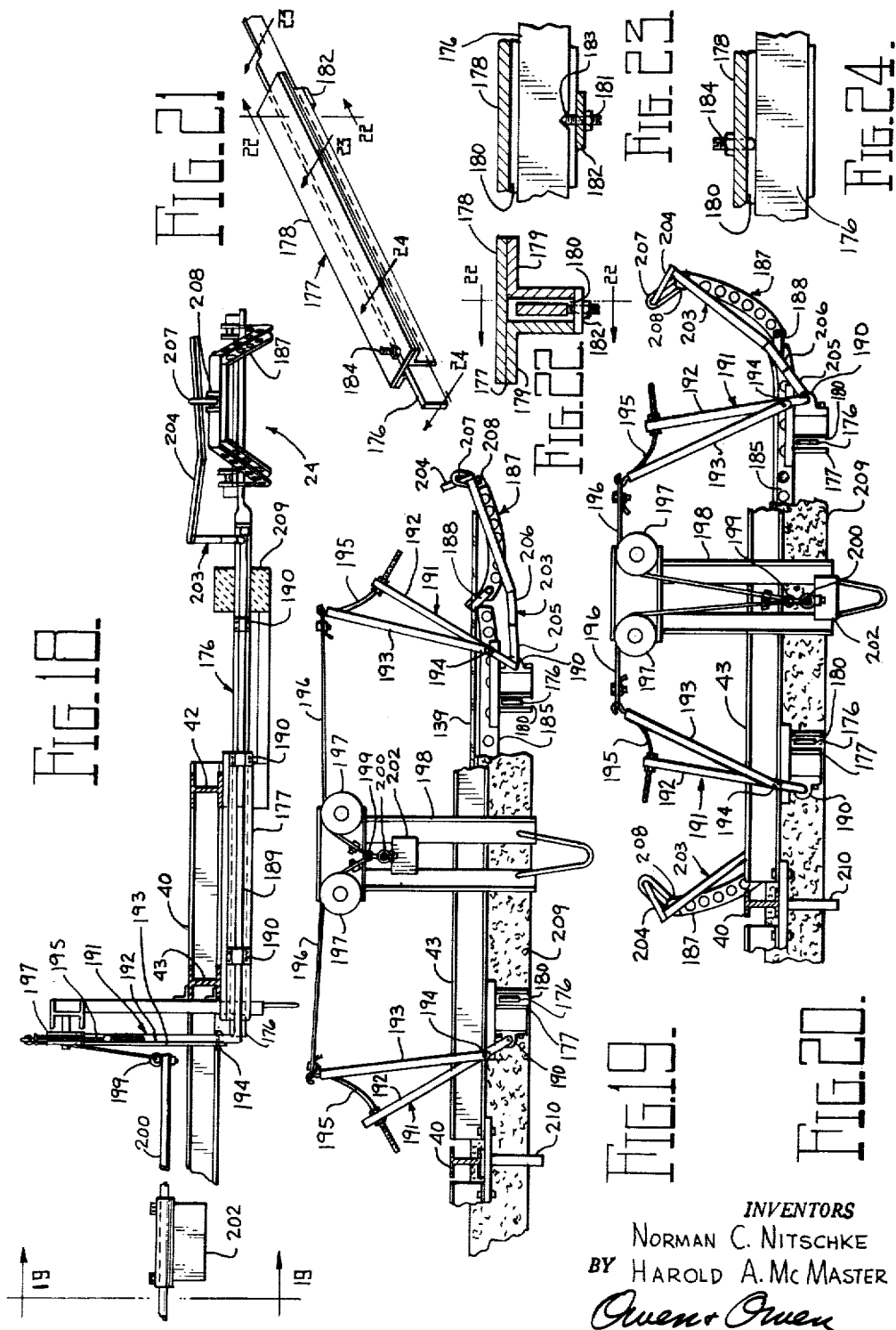

United States Patent Office 3,087,316
Patented Apr. 30, 1963

3,087,316
AUTOMATIC GLASS BENDING AND TEMPERING FURNACE
Norman C. Nitschke, Perrysburg, and Harold A. McMaster, Woodville, Ohio, assignors to Permaglass, Inc., Woodville, Ohio, a corporation of Ohio
Filed Oct. 5, 1959, Ser. No. 844,539
9 Claims. (Cl. 65—268)

This invention relates to an automatic furnace for heat treating glass, in particular for bending large sheets of glass such as those used for automotive windshields and for tempering such bent sheets of glass.

The apparatus includes not only the furnace which first softens the glass so that it will conform to a predetermined bent curvature and then heats the glass to an appropriate temperature so it can be tempered, but also associated parts such as the conveying means, the glass shaping mold mechanisms, the blast head actuating mechanisms and the controls for the entire apparatus.

While the individual treatment steps are all known in the art, a furnace embodying the invention constitutes a fully automatic apparatus for completely treating an individual sheet of plate glass cut to a predetermined profile and not only bent to a predetermined shape of complex curvature within the furnace, but also automatically treated for tempering the glass to give it great resistance to fracture.

The principal object of the instant invention is to provide an automatic furnace capable of high quantity production of identical pieces of bent tempered glass such as those utilized in automobiles, and with sufficient rapidity and simplicity of operation as to produce the bent tempered glass in such quantity as is required for automotive production.

It is another object of the instant invention to provide an automatic glass bending and tempering furnace wherein all of the devices for performing successive treatment on the glass are located in the most convenient and compact arrangement, namely, in circular form, thereby saving space and cost, and reducing the number of operators needed for the apparatus.

These objects and other and more specific objects and advantages will be better understood from the specification which follows, and by reference to the drawings, in which FIG. 1 is a plan view, with parts broken away and shown on a very small scale, of a furnace embodying the invention;

FIG. 2 is a vertical, sectional view of the furnace shown in FIG. 1 taken along the line 2—2 of FIG. 1;

FIG. 3 is a fragmentary plan view, on an enlarged scale, of drive mechanism and furnace door operating mechanism for intermittently moving the pieces of glass being treated from station-to-station into, within, and out of, a furnace embodying the invention, the mechanism being shown at the beginning of a cycle of intermittent movement;

FIG. 4 is a fragmentary, vertical, sectional view taken along the line 4—4 of FIG. 3;

FIG. 5 is a fragmentary view in elevation taken from the position indicated by the line 5—5 of FIG. 4;

Figure 6:
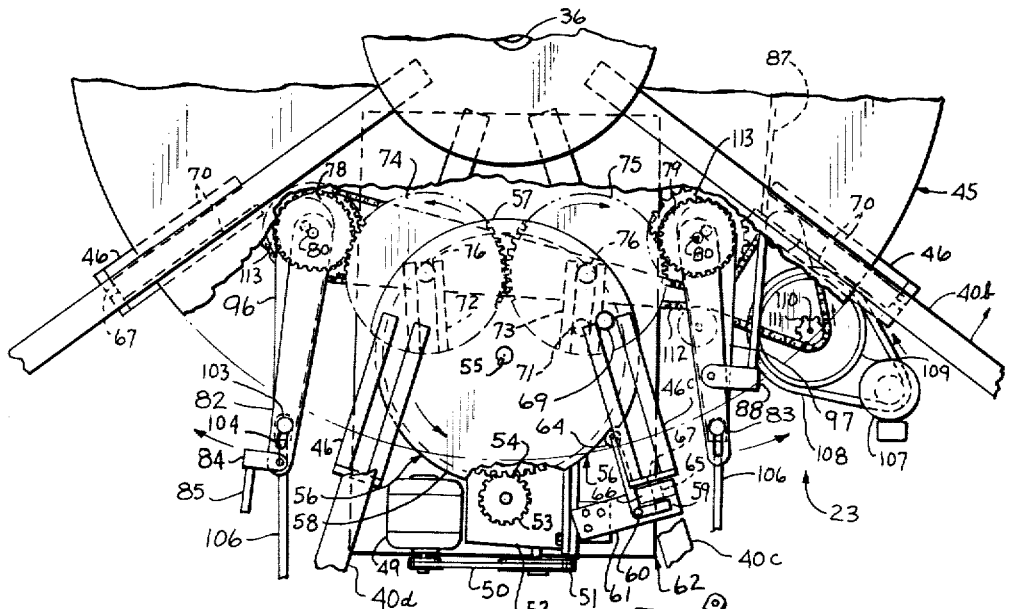
FIG. 6 is a view similar to FIG. 3, but showing the mechanism at the position near the end of an intermittent movement.

FIGS. 14–17, inclusive, are fragmentary vertical sectional views of air sealing means for a blast head, showing the air seals for the upper front, upper rear, lower front and lower rear edges thereof, respectively;

FIG. 18 is a fragmentary view, partly in elevation and partly in section, taken from the position indicated by the line 18—18 of FIG. 1 and shown on an enlarged scale;

FIG. 19 is a fragmentary transverse view taken from the position indicated by the line 19—19 of FIG. 18 and showing a glass bending mold in open position;

FIG. 20 is a view similar to FIG. 19, but showing the glass bending mold in closed position;

FIG. 21 is a fragmentary perspective view of a means for adjusting the glass molds;

FIGS. 22, 23 and 24 are detailed sectional views taken along the respective section lines of FIG. 21.

A furnace embodying the invention is illustrated in the drawings in a general circular arrangement including six heating zones, a tempering zone and three access zones. In FIG. 1, these zones are enumerated as zones I, II, III, IV, V, and VI, respectively, for the heating zones, VII for the tempering zones, and VIII, IX and X for the access zones. In the embodiment of the invention illustrated in the drawings, movement of the glass sheets to be treated is in a counterclockwise direction (FIG. 1) with a loaded mold moving in ten intermittent steps from zone X, just before it enters the furnace, to zone VIII where the treated bent glass is removed, IX where a flat sheet is loaded, and zone X, again prior to entry of a new sheet of glass into the furnace. The apparatus embodying the invention includes not only the furnace itself occupying zones I–IV, inclusive, but also the control means by which the glass bending molds are intermittently moved from station-to-station and by which a tempering blast head, generally indicated at 20 in FIG. 1, is moved between an operative position and an inoperative position, as well as details of the structures employed.

In general, the apparatus comprises a six section furnace generally indicated at 21, a blast head indicated at 20, a rotary spider generally indicated at 22, a drive and control mechanism generally indicated at 23, and ten glass carrying and bending molds 24 each of which is identical with the others.

Each of the six zones I–VI of the furnace 21 (FIG. 2) is fed with a burner manifolding system 25, comprising gas supply pipes, headers, leaders, etc., for conducting gas to a plurality of burners 26 in the interior of each of the zones I–VI of the furnace 21. The number and size of the gas pipes, headers, etc., comprising the manifolding system 25 for each furnace zone, is determined by the temperature to be achieved within that zone, so that the numbers of burners and the sizes of the pipes feeding them vary from zone-to-zone as required. The furnace 21 itself has a domed refractory top 27, inner and outer side walls 28 and 29, and a floor 30. Additional gas burners 31 may be located in the side walls 28 and 29 as needed to produce the temperatures required within each of the furnace zones. The interior of the furnace is continuously open from the entrance side of zone I to the exit side of zone VI, the furnace thus having a semitoroidal shape extending some 215° or so.

The furnace 21 is supported by a spider-like frame comprising heavy overhead beams 32 (FIG. 2), vertical supports 33, braces 34 and outer vertical supports 35. This structure is stationary and functions not only to brace and support the furnace 21, but also as a support for the rotary spider 22 which is rotated to transport the ten glass bending molds 24 around the furnace.

The rotary spider 22 comprises a center post 36 rotatably supported on a central pedestal 37 and journaled at its upper end in a journal box 38 rigidly connected by a center plate 39 to the inner ends of the beams 32. The spider 22 has ten horizontally extending arms 40, each supported by an angle brace 41 extending between the outer end of the arm 40 and the upper end of the post 36. The arms 40 are connected near their outer ends by two sets of horizontal braces 42 and 43. At their inner ends the arms 40 are rigidly connected by an upper disc 44 and a larger, lower disc 45 which also supports a plurality of Geneva channels 46 (see also FIGS. 3–7).

In order to properly heat the glass sheets carried by each of the molds 24, the spider 22 is rotated with an intermittent movement so that each mold 24 and its sheet of glass being treated is held in each of the furnace zones I–VI, inclusive, and in the tempering zone VII for a period of time long enough to treat the glass properly. The respective temperatures of the six furnace zones are so controlled that the temperature of the glass is changed appropriately in each zone in the same period of time.

Drive Mechanism

The intermittent movement of the rotary spider 22 as well as the control of doors 47 (FIG. 1) at the entrance end of the furnace 21, and 48 at the exit end of the furnace 21, and the movement of the blast head 20 between its operative and inoperative positions, are actuated and controlled by the drive mechanism 23 illustrated in FIGS. 3–7, inclusive. The drive mechanism 23 comprises a drive motor 49 which, through a belt 50, drives the input pulley 51 of a gear box 52. A pinion 53 on the output shaft of the gear box 52 is meshed with a cam drive gear 54 keyed to a vertical camshaft 55 with a circular cam 56. The circular cam 56 has a circular surface 57, of larger radius, which extends more than 180° circumferentially and a circular surface 58, of smaller radius, which completes the circle. The edge of the circular cam 56 actuates a spider index crank 59 pivoted on a vertical pin 60 and supported on a brace 61 carried by a drive box 62. The drive box 62 rests upon a pair of support beams 63 carried on the floor adjacent the pedestal 37. A roller 64 is carried by a longer arm of the bell crank 59 and runs on the peripheral surface of the cam 56. The shorter arm of the bell crank 59 is aligned with and actuates a biased index pin 65 which slides horizontally in a block 66 on the end of the brace 61. The pin 65 is in horizontal alignment with a series of indexing openings 67 one of which is drilled in each of the cross-bars 68 of the Geneva channels 46. When the surface 57 of the cam 56 is engaged with the roller 64 on the bell crank 59, for example, as shown in FIG. 3, the bell crank 59 is swung in a clockwise direction and the biased pin 65 withdrawn into the block 66. When the cam 56 has been rotated sufficiently so that the roller 64 drops onto the surface 58 of the cam 56 (see FIG. 6), the spring bias urges the pin 65 into that one of the index holes 67 in that one of the Geneva channels 46 aligned therewith. This locks the spider in position, holding it against further rotation while the cam 56 continues to rotate for opening and closing doors or moving the blast head in a manner to be described below.

The rotary spider 22 is moved from position-to-position by the engagement of a Geneva roller 69 with the Geneva channels 46. Each of the spider arms 40 has an associated Geneva channel 46 mounted on the under side of the disc 45 extending radially beneath the respective arm 40 and comprising a pair of parallel bars 70 connected at their outer ends by the cross-bar 68 and open at their inner ends. The Geneva roller 69 is mounted on the upper surface of the cam 56 at a distance from the shaft 55 such that it will freely enter the opening between the inner ends of the bars 70 of the Geneva channels 46. The roller 69 is shown in FIGS. 3 and 4 just after it has entered a Geneva channel 46c of a spider arm 40c. Continued rotation of the cam 56 and Geneva roller 69 from the position shown in FIG. 3, in a counterclockwise direction, rotates the spider 22, carrying the Geneva channel 46c and its arm 40c from the position shown in FIG. 3 to the position shown in FIG. 6. The Geneva roller 69 is illustrated in FIG. 6 just at the point of departing from the open end of the Geneva channel 46c. FIG. 6 also shows how the indexing roller 64 of the indexing crank 59 drops off the surface 57 of the cam 56 to lock the spider 22 in position immediately after the Geneva mechanism has moved it to the position of FIG. 6.

A second Geneva roller 71 is carried on the under side of the cam gear 54 at a radial distance from the shaft 55 such that it enters and leaves a pair of Geneva channels 72 and 73 each mounted on the upper side of one of a pair of meshing gears 74 and 75. The gears 74 and 75 are mounted on the upper ends of shafts 76 which are journaled by bearings 77 mounted in the drive box 62. The gears 74 and 75 are meshed, respectively, with smaller outboard gears 78 and 79, the gears 78 and 79 being secured on the lower ends of shafts 80 journaled by pillow blocks 81 mounted on the outer sides of the drive box 62. The ratios between the gears 74 and 78 and between the gears 75 and 79 are 2:1 in each case, so a 90° movement of the two larger gears 74 and 75 produces a 180° movement of the smaller gears 78 and 79.

An arm 82 is rigidly attached to the under side of the gear 78 extending horizontally outwardly (downwardly FIG. 3) therefrom. A similar arm 83 is similarly attached to the gear 79 and extends parallelly to the arm 82. The arm 82 is connected by a yolk 84 (FIG. 3) to a rod 85 which extends outwardly beneath the rotary spider 22 and at its remote end (FIGS. 8 and 9) is attached by a strut 86 to the exit door 48 of the furnace. A similar rod 87 is attached by a yoke 88 to the arm 83 extending backwardly therefrom and being coupled by a clevis 89 to a crank 90 which is pivoted upon an arm 91 (FIGS. 8 and 9) extending backwardly from the drive box 62. The other end of the crank 90 is pivotally connected by a clevis 92 to the inner end of a door actuating rod 93 connected by a strut 94 to the entrance door 47. The entrance and exit doors 47 and 48 are mounted by suitable channels (not shown) for sliding movement between the open positions fragmentarily indicated in FIG. 8 and the closed positions indicated in FIG. 9.

In the position of the actuating mechanism 23 shown in FIG. 3, the doors 47 and 48 are open and, as mentioned above, the spider drive comprising the Geneva roller 69 has just engaged for the purpose of rotating the spider 22. After the spider 22 is rotated and just before the mechanism 23 reaches the position shown in FIG. 6, the Geneva roller 71 enters the end of the Geneva channel 73 on gear 75. Immediately after the spider 22 is stopped in the position shown in FIG. 6 and the spider index pin 65 has locked the spider 22 in place, the Geneva roller 71 starts to swing the Geneva channel 73, rotating the gear 75 in a clockwise direction and the gear 74 in a counterclockwise direction. This swings the door actuating arms 82 and 83 in a clockwise and counterclockwise direction, respectively, pulling on the rod 85 and thrusting the rod 87 to rock the crank 90, so that the door actuating rods 85 and 93, respectively, pull the doors across the exit and entrance ends of the furnace, reaching closed position when the mechanism 23 arrives at the position illustrated in FIG. 7.

Figure 7:
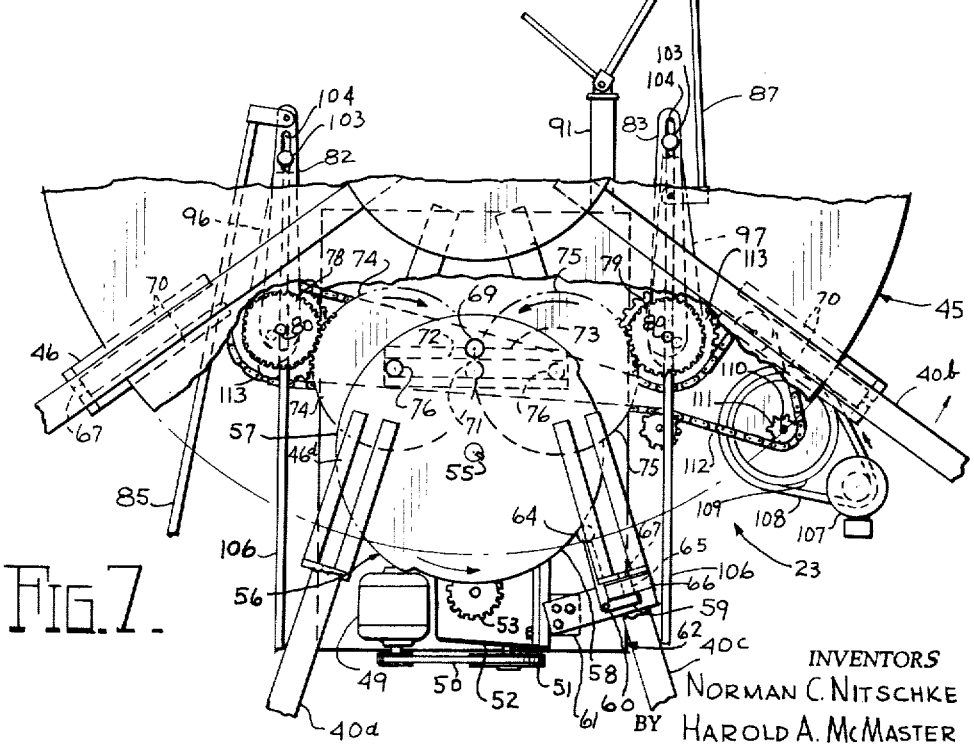
FIG. 7 is a view similar to FIGS. 3 and 6, but showing the mechanism with the glass carrying means at rest and illustrating the operation by the mechanism of the furnace doors.

At this point, the furnace doors 47 and 48 are closed, the spider 22 is locked in position, and a period of time elapses during which each of the glass carrying molds 24 is held in one of the six furnace zones, the tempering zone, or one of the three unloading and loading zones. The position illustrated in FIG. 7 is thus a rest position. The duration of rest in the position of FIG. 7 is under the control of timing mechanism (not shown) which de-energizes the cam driving motor 49 during this period. At the end of the rest period, a signal from the timer again motivates the cam drive motor 49 and through the drives already described the mechanism 23 starts to rotate from the position shown in FIG. 7 toward the position shown in FIG. 3. The first action which occurs is for the Geneva roller 71 to enter the end of the Geneva channel 72 on the gear 74 rotating the gear 74 in a clockwise direction and the gear 75 in a counterclockwise direction. This swings the two door actuating arms 82 and 83 from their rear position of FIG. 7 toward and to their forward position of FIG. 3, sliding the doors 47 and 48 open. As previously described, the spider actuating Geneva roller 69 then enters the end of the next one of the Geneva channels 46, i.e., the Geneva channel 46d of the spider arm 40d (FIG. 7), to again rotate the spider through 36°.

Blast Head Movement

Figure 8:
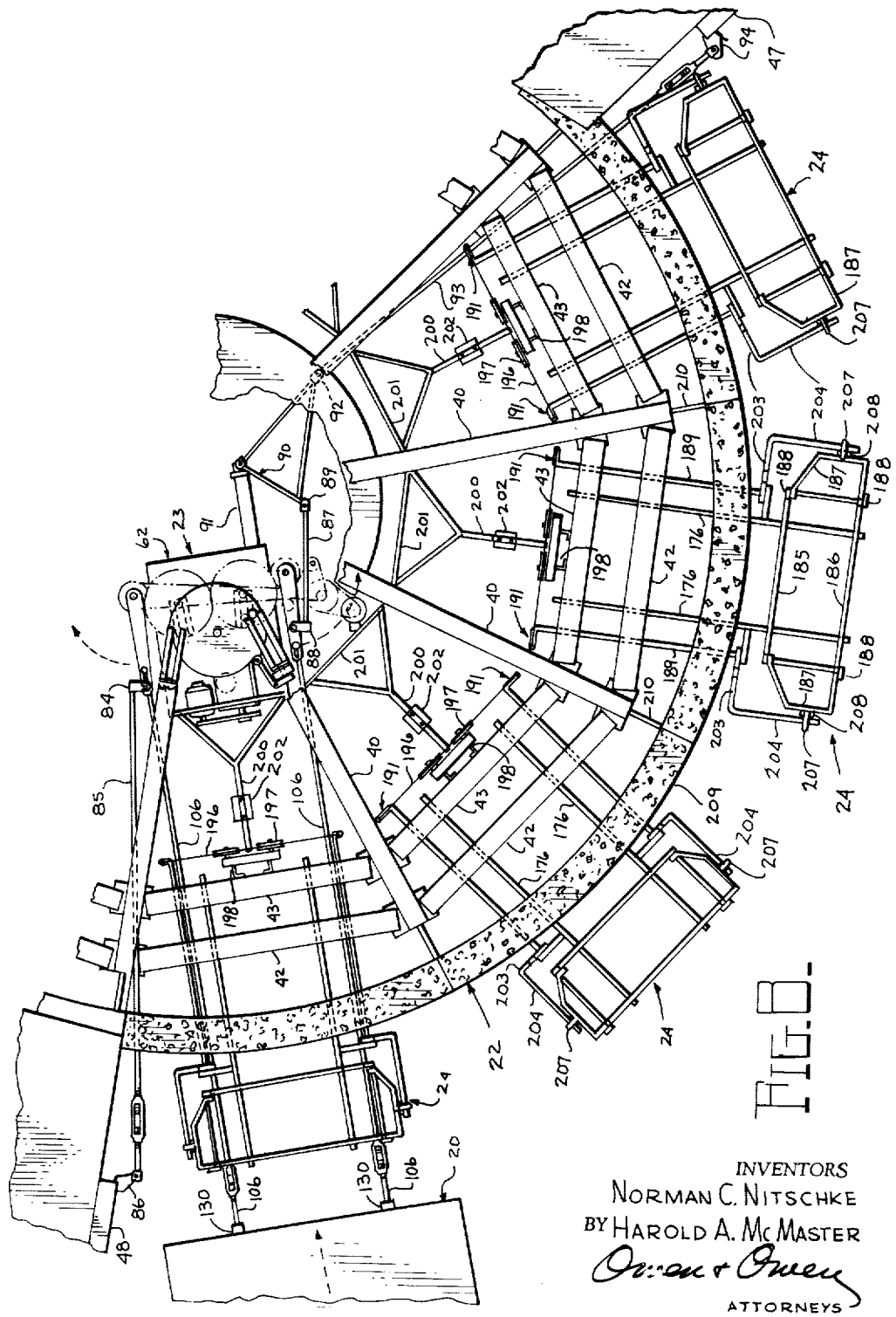
FIG. 8 is a fragmentary plan view on an enlarged scale, showing furnace door operating linkage and blast head moving linkage actuated by the control mechanism of FIGS. 3–7, inclusive, with the blast head illustrated in inoperative position and the furnace doors open.
Figure 9:
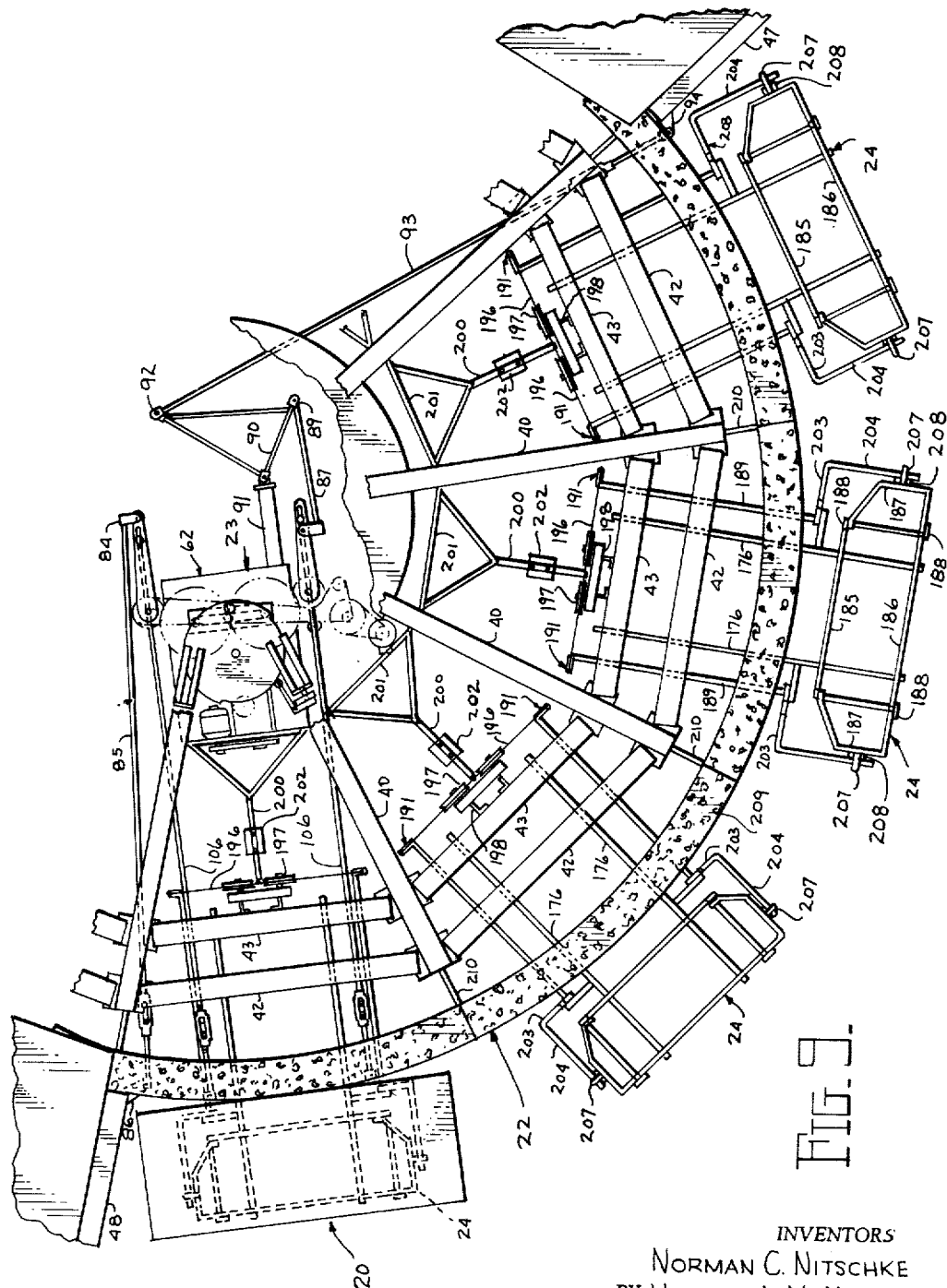
FIG. 9 is a view similar to FIG. 8, but showing the furnace doors closed and the blast head in operative position.
Figure 10:
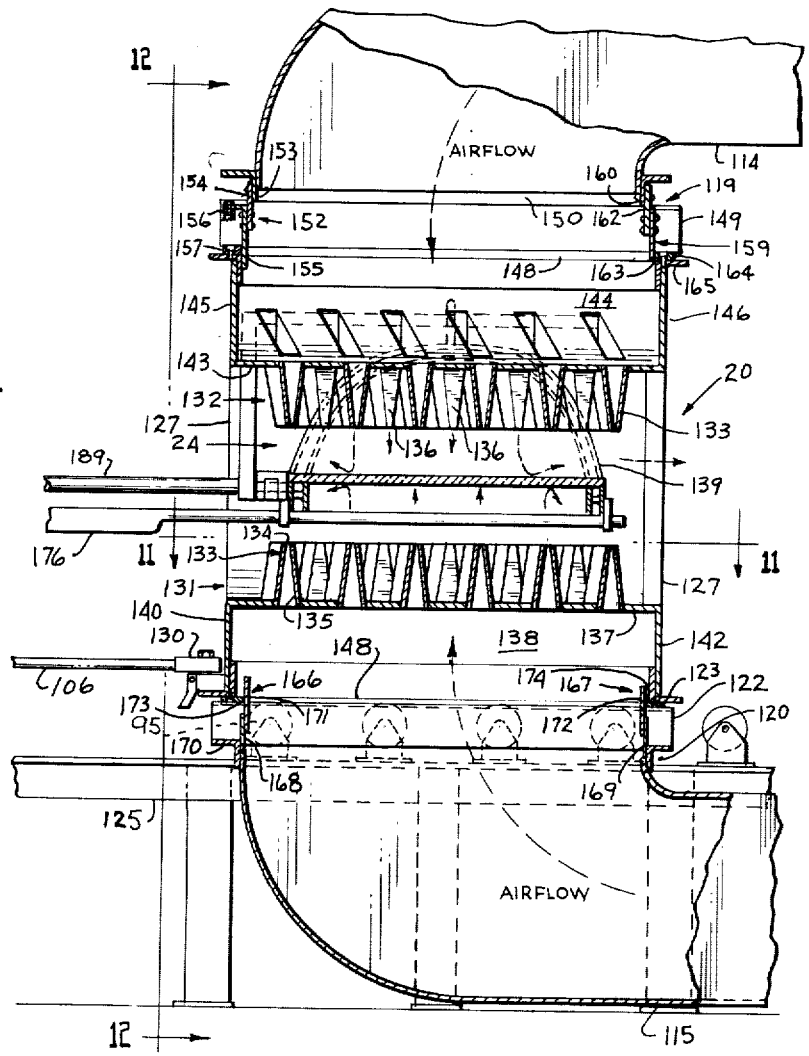
FIG. 10 is a fragmentary, vertical, sectional view taken along the line 10—10 of FIG. 1 and shown on an enlarged scale.
Figure 11:
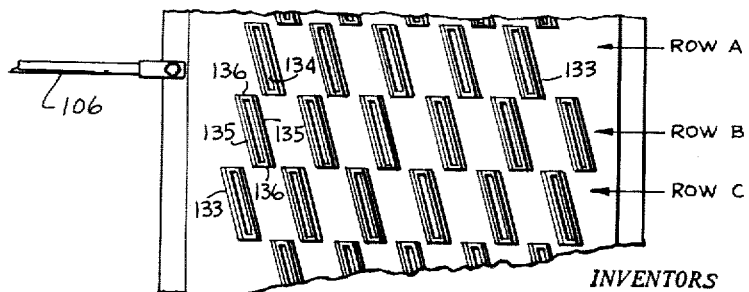
FIG. 11 is a fragmentary, horizontal, sectional view taken along the line 11—11 of FIG. 10.
Figure 12:
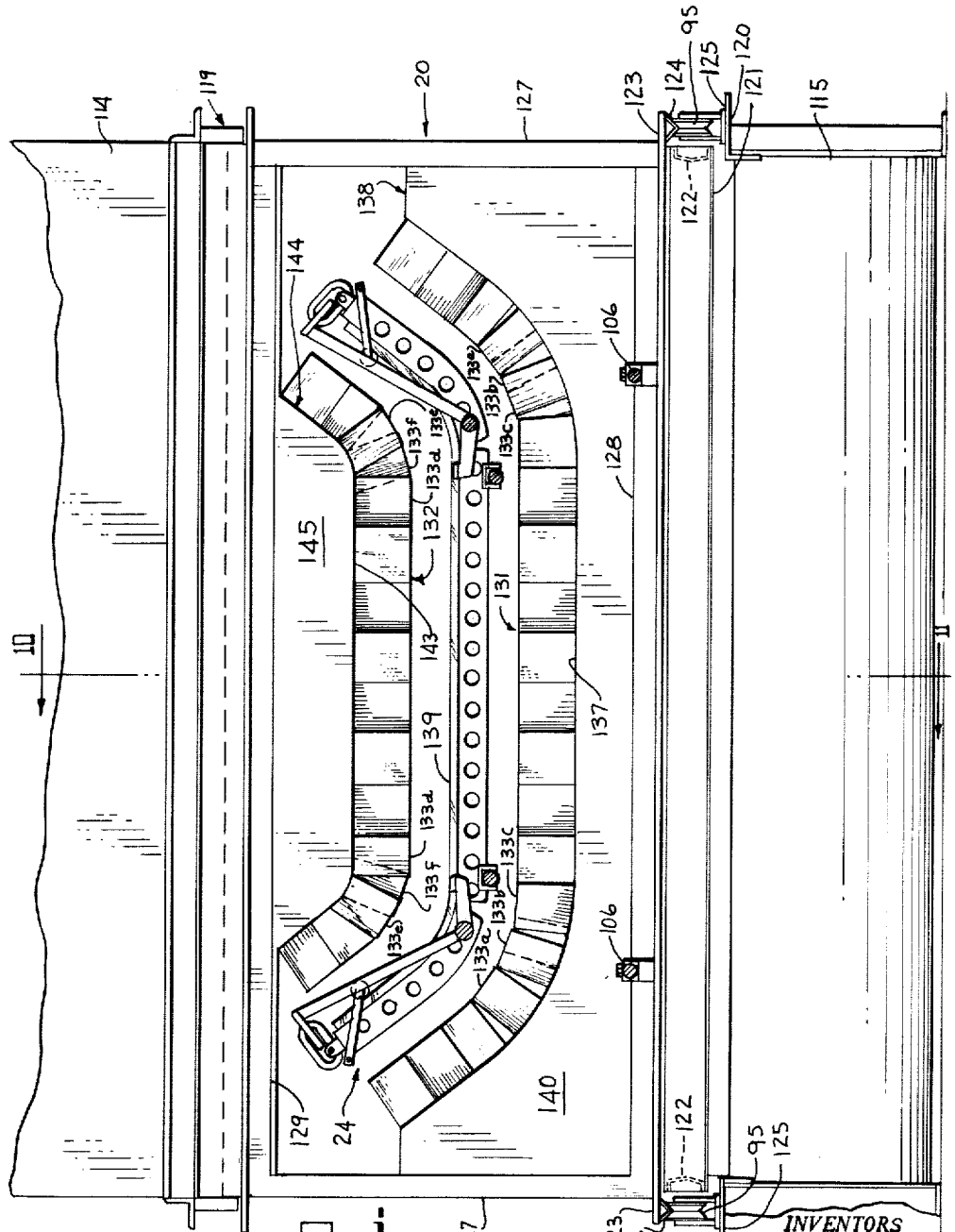
FIG. 12 is a fragmentary, vertical, sectional view taken along the line 12—12 of FIG. 10.

The blast head 20 is movable between two positions in one of which (FIGS. 1, 2, 8 and 13) it is located radially outwardly of the path of movement of the glass molds 24 and in the second of which it encloses that one of the glass molds at the tempering zone VII (FIGS. 9, 10 and 12). The construction of the blast head 20 and the tempering operation performed thereby will be described below.

The blast head 20 is reciprocated between its two positions in a radial direction, being movable on a set of rollers 95 arranged in two parallel series. Movement of the blast head between the two positions described is controlled by the mechanism 23. Associated with each of the door actuating arms 82 and 83 there is a blast head moving arm 96 or 97, respectively. The two arms 96 and 97 function identically and each of them comprises identical parts except for the reversal of their relationships. The blast head arm 96 (FIGS. 3–5) extends parallel to and beneath its associated door actuating arm 82. The blast head arm 96 is mounted for swinging movement on a short vertical shaft 98 which is carried by a crank arm 99. The crank arm 99 is pinned on the upper end of a vertical rotary shaft 100 journaled in pillow blocks 101 on a horizontal frame 102 adjacent the drive box 62. The ends of the arms 82 and 96 are connected to each other by a pin 103 fixed in the end of the arm 96 and extending through a narrow longitudinal slot 104 (see FIGS. 3 and 5) near the end of the arm 82. At the lower end of the pin 103 there is secured a clevis 105 which retains a blast head connecting rod 106. Because of the identity in function and design of the two blast head moving arms 96 and 97 and their associated parts, similar parts of the arm 97 are indicated by reference numbers identical with those used with respect to the arm 96.

When the door actuating arms 82 and 83 are swung from the position indicated in FIG. 3 to the position indicated in FIG. 7, engagement of the pins 103 with the side walls of the slots 104 causes the blast head moving arms 96 also to be similarly swung. This pulls on the blast head connecting rods 106 which, being attached at their outer ends to the blast head 20, pulls the blast head 20 from the position shown in FIG. 8 to the position shown in FIG. 9. The blast head 20 is thus in its inner position surrounding the blast mold 24 in zone VII during the timed delay controlled by the timer and when the mechanism 23 is in the position as shown in FIG. 7. When the mechanism 23 is actuated to move from the position shown in FIG. 7 to the position shown in FIG. 3, the blast head arms 96 are swung, along with the door actuating arms 82, so that the blast head 20 is moved out of the way at the same time that the doors 47 and 48 are opened and just prior to the beginning of a subsequent movement of the spider 22.

During the delay time when the mechanism 23 is in the position shown in FIG. 7 and the particular one of the glass molds is in the tempering zone VII, an auxiliary mechanism, illustrated in FIGS. 3–7, is energized to oscillate the blast head 20 while it is in its operative position. The auxiliary blast head oscillating mechanism comprises a motor 107, which, through a belt 108, rotates a pulley 109 and sprocket shaft 110 journaled in suitable journals on the frame 102. A sprocket 111 on the shaft 110 is engaged with a drive chain 112 which is also engaged with suitable idler pulleys and with a pair of driven sprockets 113, one of which is mounted upon each of the crankshafts 100 and the cranks 99. This oscillates the arms 96 along their longitudinal axes, reciprocating the pins 103 in the slots 104 of the door arms 82 and 83 and, through the blast head connecting rods 106, reciprocating the blast head 20 upon the rollers 95. The purpose for reciprocating the blast head 20 is, of course, to distribute jets of tempering air emitted by the blast head 20 over the surfaces of the curved sheet of glass in the glass mold 24 located at the tempering zone VII and within the confines of the blast head 20. The period of oscillation is under the control of the same timer which controls the energization of the motor 49 or the drive mechanism 23, so that at the end of the dwell or delay period the oscillation motor 107 is de-energized to terminate the reciprocation of the blast head 20.

Figure 13:
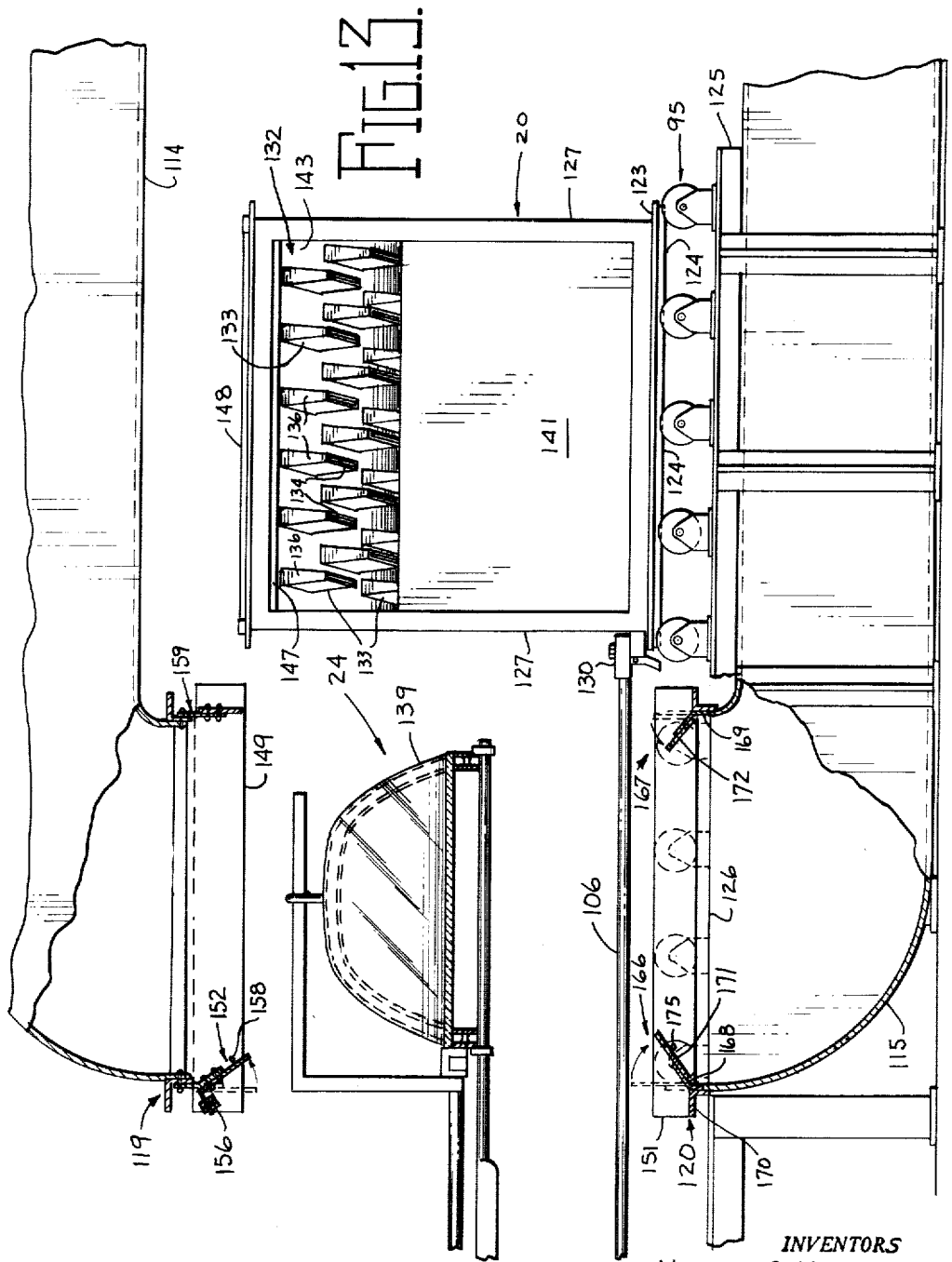
FIG. 13 is a view similar to FIG. 10, but showing the blast head in inoperative position.

Because the motor 107 is controlled independently of the drive mechanism 23, it is energized and de-energized in accordance with the position of the blast head 20. The purpose of reciprocating the blast head 20, as explained, is to distribute the chilling effect over the surfaces of the sheets of glass being tempered so reciprocation of the blast head 20 needs to take place only when the blast head 20 is in operative position, i.e., its inner position surrounding a sheet of glass, as illustrated in FIG. 10. Therefore, when the blast head 20 is in its outer or inoperative position as illustrated in FIG. 13, it is stationary and does not oscillate.

After the delay period has terminated and the control mechanism 23 moves from the position shown in FIG. 7 to the position shown in FIG. 3, the doors 47 and 48 are once again opened and the blast head 20 moved to its outer position (FIG. 8) so that the spider 22 and glass molds 24 can be indexed 36° without interference.

Blast Head Construction and Operation

The blast head 20 (FIG. 2) is supplied with air by an air duct system comprising an overhead duct 114 and a lower duct 115 both of which are supplied by a blower generally indicated at 116. A shutter 117 is mounted across a main air duct 118 from which the ducts 114 and 115 are fed, the shutter 117 being actuated to cut off air flow from the main duct 118 through the ducts 114 and 115 when the blast head is in its outer or inoperative position and to direct air into the ducts 114 and 115 when the blast head is in its inner or operative position.

The overhead duct 114 (FIGS. 10–13) is turned downwardly and terminates in a horizontal, rectangular frame 119 having substantially the same lateral dimensions as the top of the blast head 20. Similarly, the lower duct 115 is turned upwardly and terminates in a horizontal rectangular frame 120 having the same dimensions as the bottom of the blast head 20. The frames 119 and 120 of the ducts 114 and 115 are vertically spaced from each other and aligned one above the other so that when the blast head 20 is in its inner, operative position, it extends across the space between the two frames 119 and 120 and closes the ends of the ducts 114 and 115. The blast head is shown in this operative position in FIGS. 10 and 12 and in its outer or inoperative position in FIG. 13.

The blast head 20 itself comprises a bottom frame of transversely extending beams 121 and radially extending beams 122. A skirt 123 bounds the beams 121 and 122 and supports a pair of parallel tracks 124 which ride the two sets of rollers 95, one at each side of the blast head 20. Each set of rollers 95 is supported by a horizontal beam 125 forming part of the side frame for the lower duct 115 and by a side member 126 of the rectangular frame 120. All of the rollers in each set 95 are aligned and at the same horizontal level, so that the blast head 20 rides on its tracks 124 inwardly and outwardly on the two sets of rollers 95. Erected above the skirt 123 is an open framework comprising four vertical supports 127, one at each corner of the blast head 20, which are connected to each other by appropriate horizontal frame members 128 at the bottom and 129 at the top of the blast head 20. As mentioned above, the blast head connecting rods 106 are tied to the blast head 20 at the lower front cross member 128 by releasable couplings 130 (FIG. 10).

The blast head 20 has two groups of air nozzles comprising a lower set 131 and an upper set 132. Nozzles 133 in the sets 131 and 132 are generally similar to each other, all having cross sections which are parallelograms and being elongated generally transversely of the direction of movement of the blast head 20 both between its operative and inoperative positions, and during its reciprocation. Each nozzle 133 has a narrow orifice 134 formed by converging side walls 135 and parallel end walls 136. As can best be seen by reference to FIGS. 11 and 13, the nozzles 133 in each of the sets of nozzles 131 and 132 are arranged in staggered rows and they are all inclined relative to the rectangular frames of the blast head 20. The orifices 134 of one row of nozzles 133, for example the row indicated as row A in FIG. 11, overlap the orifices 134 in the nozzles 133 in the adjacent row B and, similarly, the orifices in the nozzles 133 of row B overlap those of the nozzles 133 of row C. This staggered, skewed and overlapping relationship exists in both the lower set of nozzles 131 and the upper set of nozzles 132 so as to provide complete coverage of the surfaces of a bent sheet of glass 139 held in one of the molds 24 when the blast head 20 is operative.

The lower set of nozzles 131 is mounted in a common curved cover 137 of a lower plenum chamber, generally indicated at 138. As can best be seen by reference to FIG. 12, the lower set of nozzles 131 and the cover 137 of the plenum chamber 138 in which they are mounted is curved according to the transverse curvature of the sheets of glass 139 as bent into finished shape by the glass mold 24. The purpose for this complemental shape is to cause the application of the jets of air delivered by the nozzles 133 to the entire under surface of the pane of glass 139, to be as close to equal force and temperature as possible. The lower plenum chamber 138 also includes a front wall 140 (FIG. 12), two side walls 141 (FIG. 13) and a back wall 142 (FIG. 10). The plenum chamber 138 is, therefore, open across its entire bottom and its bottom opening is mated with the frame work 120 of the lower air duct 115 when the blast head is in operative position. At each area of sharp curvature, nozzles 133a, 133b and 133c (FIG. 12) are separated at their bases in order to keep their cross sections constant and their orifices aligned with the overall pattern.

The upper set of nozzles 132 is similarly mounted in a bottom plate 143 of an upper plenum chamber 144 formed by the bottom plate 143, a front wall 145, a back wall 146 and short end walls 147. In a manner similar to the lower plenum chamber 138, the upper plenum chamber 144 is open at its top and its open top mates with the frame 119 of the upper duct 114 when the blast head 20 is in its operative position. At the two areas of sharp curvature, nozzles 133d and 133e in one row are separated at their outer ends, with a nozzle 133f of the next row placed across the separation between nozzles 133d and 133b, again, to give complete coverage of the glass area.

Air Seals

Because the blast head 20 constitutes a continuation of both the upper and lower air ducts 114 and 115 when it is in operative position, and yet is moved therefrom to inoperative position during the movement of the rotary structure, apparatus embodying the invention has air sealing means for closing the margins between the frames 119 and 120 and the blast head 20.

The air sealing means are illustrated in FIGS. 10 and 13–16. At the sides of the blast head 20, i.e., the radially extending margins of the frames 119 and 120, the air sealing means need only comprise strips of gasket material 148 (FIG. 10) mounted at the top and bottom side frames of the blast head 20 and engageable with side seals 149 (FIG. 13) which depend from side members 150 of the upper frame 119 (see also FIG. 14) and side seals 151 which are erected upon the side members 126 of the lower frame 120.

At the inner and outer edges of the blast head 20 at both the top and bottom, the air sealing means are adapted to seal between the top and bottom frames 119 and 120 and the blast head 20 during the radial reciprocatory movement of the blast head 20 in operative position and also to be automatically displaced when the blast head 20 moves between its operative and inoperative positions. For example, at the upper inner side of the frame 119 (FIG. 14) an air seal 152 is dependingly supported by a cross member 153 of the frame 119. The air seal 152 comprises a flexible strip 154 secured to the cross frame member 153 to which is riveted or otherwise secured a flap 155 having a counterweight 156. The flap 155 extends all the way across the frame 119 and across the frame member 129 of the blast head 20. The vertical edges of the flap 155 are in sweeping contact with the surfaces of the side seals 149. The lower edge of the flap 155 hangs down beyond the inner surface of a strip gasket 157 which is secured at the upper inner corner of the cross frame 129. The counterweight 156 extends inwardly (toward the center of the apparatus) and thus tends to urge the air seal 152 and its flap 155 in a counterclockwise direction (FIG. 14).

When the blast head 20 is in operative position, air flowing downwardly from the duct 114 forces the flap 155 outwardly against the strip gasket 157 preventing escape of air therethrough. As the blast head 20 is reciprocated during a tempering operation, air pressure acting against the flap 155 holds it in contact with the strip gasket 157 as illustrated in broken lines in FIG. 14 where the strip gasket 157 is shown at positions 157a and 157b.

Figure 14:
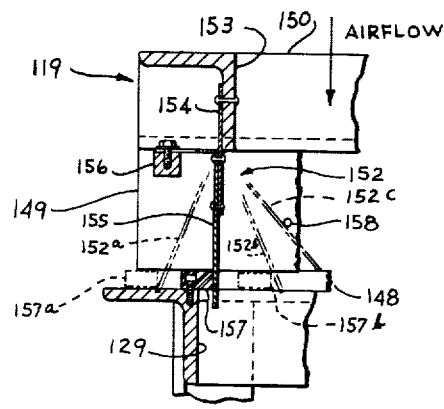
Figure 15:
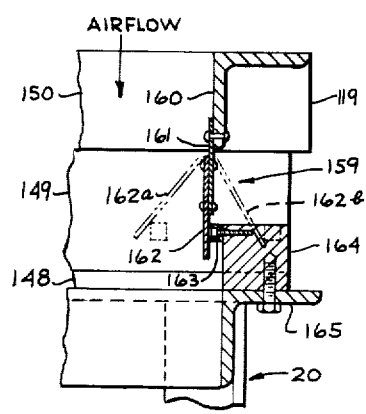

When the blast head 20 is moved to its outer or inoperative position, because the air flow from the duct 114 is shut off, the weight 156 swings the air seal 152 to the upper position illustrated in FIG. 13 and indicated in FIG. 14 by the reference number 152c. A stop pin 158 extends inwardly through each of the side seals 149 to prevent the movement of the air seal 152 beyond that position. In this upper position (indicated by the reference number 152c in FIG. 14) the lower edge of the flap 155 is above the level of the surface of the strip gasket 157 so that the blast head 20 can be moved outwardly to inoperative position and back into operative position without contacting the air seal 152. After return to operative position illustrated in FIG. 14, when the air is again turned on in the duct 114, it again swings the flap 155 into contact with the strip gasket 157.

At the outer edge of the upper frame 119 (FIG. 15) an air seal 159 is dependingly mounted by a cross frame member 160. The air seal 159 comprises a flexible strip 161 secured to the cross frame member 160 and a thin flap 162. The flap 162 extends all the way across between the side seals 149 and its ends are in sweeping engagement therewith. The flap 162 seals against a strip gasket 163 secured to the inner side of a cross bar 164 which is erected upon a cross member 165 of the upper frame of the blast head 20. During reciprocation of the blast head 20 air flow from the duct 114 holds the flap 162 against the strip gasket 163 as indicated by the broken line illustration 162a and 162b in FIG. 15.

It will be observed that the downward extent of the flap 162 is less than that of the flap 155 of the inner air seal 152. Therefore, the blast head with its sealing gaskets 148 and strip gasket 157 does not contact the lower edge of the flap 162 at any time and the movement of the blast head 20 between operative and inoperative position does not require the displacement of the flap 162 of the air seal 159.

At the frame 120 of the lower air duct 115 there are located two air seals 166 (FIG. 16) at the inner side and a similar air seal 167 (FIG. 13) at the outer side. These two air seals 166 and 167 are substantially identical, merely being reversed with respect to each other.

The bottom air seals 166 and 167 (FIGS. 16 and 17) comprise flexible strips 168 and 169, respectively, which extend upwardly from cross members 170 of the lower frame 120 and flaps 171 and 172, respectively, supported thereby. The flaps 171 and 172 are in sweeping engagement with the side seals 151 and seal against strip gaskets 173 (on the front seal 166) and 174 (on the rear seal 167) each of which is mounted at the lower inner corner of the respective cross frame member 128 of the blast head 20. As in the case of the air seals 152 and 159, the flaps 171 and 172 of the air seals 166 and 167 are urged into sealing contact with the strip gaskets 173 and 174 by the flow of air upwardly from the air duct 115. During reciprocation of the blast head 20 the flap 171 is held against the strip gasket 173 even at the remote positions indicated by the reference numbers 171a and 171b and 173a and 173b, respectively.

Figure 16:
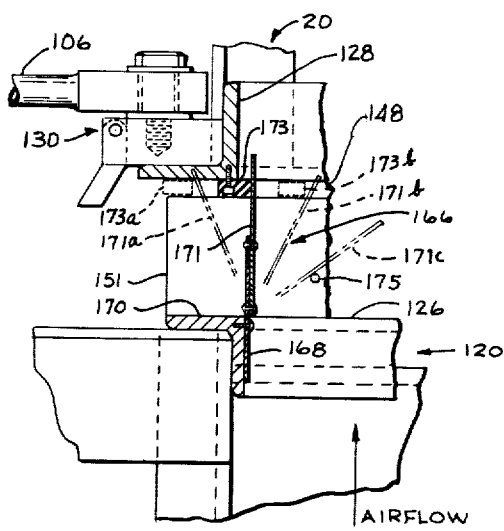
Figure 17:
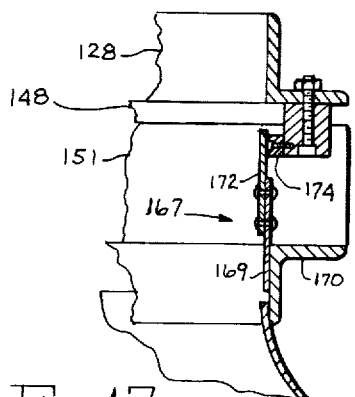

When the air flow is turned off gravity causes the flap 171 to swing downwardly and inwardly to the position indicated by the reference number 171c in FIG. 16 and against stop pins 175 which extend inwardly through the side seals 151. In this lower position, the upper edge of the flap 171 is below the level of the strip gasket 173 so that it does not interfere with the movement of the blast head 20 between operative and inoperative position. The flap 172 extends upwardly a lesser distance than the flap 171 so as to clear the blast head frame when it is moved to inoperative position and its cooperating gasket 174 is mounted correspondingly lower on its strip 169.

*Glass Mold Construction*

Each of the individual glass molds 24 is supported between the ends of a pair of spider arms 40, being mounted upon two outwardly extending, generally parallel bars 176 (FIGS. 8, 9 and 18–24). Each of the bars 176 is carried in an inverted U-channel 177 (FIG. 21) which is welded or bolted to the two horizontal braces 42 and 43. Each of the inverted U-channels 175 comprises a horizontal plate 178 and a pair of angle irons 179 secured to the under side of the plate 178 with their vertical webs spaced horizontally from each other, forming an open bottomed channel 180. The bar 176 extends through its channel 180, being pivotally supported therein on the upper end of a threaded pin 181 which is threaded through a cross plate 182 welded to the bottoms of the horizontal arms of the channels 179. The pin 181 is received in a notch 183 cut in the under edge of the bar 176. At the rear or inner end of the bar 176 (FIG. 24) a downwardly extending thrust pin 184 is threaded through the plate 178 and into contact with the upper edge of the bar 176. By suitably adjusting the bolts 182 and 184, the respective bar 176 may be angularly adjusted around the pivot point provided by the pin 181, several degrees on each side of horizontal, so that each pair of bars 176 which support one of the molds 24 may be angularly adjusted relative to each other.

Each of the molds 24 comprises a pair of lightweight side frames 185 and 186 (FIG. 8) and two generally U-shaped, lightweight, wings 187. Each of the wings 187 is pivotally connected to the two side frames 185 and 186 by a pair of short pivot links 188 (FIGS. 19 and 20). The wings 187 are lifted from the lower glass receiving position, indicated in FIG. 19 and in FIG. 1 at zones IX and X, to the upper glass bending position illustrated in FIG. 20, and in zones VII and VIII of FIG. 1, by a linkage including a pair of rocking shafts 189 which extend outwardly parallel to each other and parallel to the support bars 176. Each of the rocking shafts 189 is journaled in several bearings 190 (FIG. 18) which are spaced along the channels 177 and at its inner end the rocking shaft 189 has a lever arm 191 which comprises an arm 192 welded or otherwise secured to the rocking shaft 189 and a second, extension arm 193 which is pivotally mounted on the arm 192 at a point a short distance away from the center line of the rod 189, for example by a pivot pin 194. The upper ends of the arms 192 and 193 are connected to each other by a bent threaded rod 195 so as to provide for adjustment of the angular relationship between the arms 192 and 193.

The end of each of the arms 193 is connected to a cable 196 which leads over a pulley 197 that is journaled at the upper end of a tower 198 carried by the inner cross frame 43. The two cables 196 from the two lever arm sets 191 of a single glass mold 24, are both attached to an eye 199 at the outer end of a weight arm 200. The weight arm 200 is bifurcated at its inner end (FIG. 8) and secured to a chord rod 201 which is swivelably mounted in suitable bearings on the under sides of two adjacent spider arms 40 to provide for angular movement of the weight rod 200 in a vertical, radial plane. A weight 202 is slidably carried on the weight rod 200, being movable along the rod 200 to vary its moment of force for pulling downwardly on the cables 196, swinging the sets of lever arms 191 inwardly and rotating the rocking shafts 189.

At its outer end each of the rocking shafts 189 carries a lever arm 203 on the upper outer end of which there is mounted a generally horizontally extending lift finger 204. The lever arm 203 comprises two telescoped tubes 205 and 206, or a tube and bar or similar parts, which are swivelable relative to each other and can be clamped in selected relative positions by clamping means (not shown). Swiveling the two parts 205 and 206 relative to each other varies the angular relationship between the respective support finger 204 and its rocking shaft 189, at each side of the mold 24, so as to result in one of the fingers 204 being lifted higher or lower than the other one of the fingers 204 when desired, to permit adjustment of the relative lifts of the two wings 187 of a single mold 24. Each of the lifting fingers 204 extends through a shackle 207 connected by a yoke 208 to the end of its respective mold wing 187.

The support bars 176 and the rocking shafts 189 extend through suitable openings in a refractory ring 209 composed of a series of segmental blocks supported by extension plates, one of which extends from each of the spider arms 40 (see also FIGS. 2 and 8). The refractory ring 209 is positioned to travel in an annular slot formed in the inner annular wall 28 of the furnace 21 being guided by suitable guide rails 211 which are in turn attached to the outer sides of the vertical supporting beams 33. The refractory ring 209 travels with the rotary spider 22 and the glass carrying and bending molds 24 during operation of the furnace in order to seal the slot through which the mold support bars protrude into into the interior of the furnace 21.

When a sheet of glass 139 is placed in one of the glass molds 24 at zone IX (FIG. 1), the operator swings the mold wings 187 downwardly to the position indicated in FIG. 19 and lays the sheet of glass in place, extending across horizontally between and supported by the ends of the side frames 185 and 186, with the ends of the sheet of glass extending over but not touching the wings 187 in their lower positions. The weight 202 on the weight arm 200 urges downwardly on the cables 196, urging the wings 187 upwardly against the under surface of the ends of the sheet of glass 139. As the glass 139 moves through the furnace and softens, the weight arm 200 swings the wings 187 upwardly bending the glass 139 into the shape determined by the edge contours of the side frames 185 and 186 and the wings 187.

Because of the impossibility of constructing all of the components of the furnace and the molds 24 identically, and because of the impossibility of maintaining completely perfect rates of heat application and heat loss over the entire surface of a sheet of glass 139 being bent and over the entire structure of a glass mold 24, it is frequently necessary to twist the glass contacting elements of a mold 24 relative to each other. This is provided for both by the adjustment of the relative angles of the two support bars 176 and of the angular positions of the supporting fingers 204. In addition, of course, the arms 192 and 193 of each of the sets 191 may be angularly adjusted relative to each other through the medium of the threaded adjustment rods 195.

What we claim is:

1. In an automatic glass bending and tempering furnace for glass sheets having lengths substantially greater than their widths, said furnace having a generally toroidal heating chamber extending less than 360°, with a plurality of sections of differing temperature, the improvement comprising a centrally mounted, rotary spider having a plurality of radial arms extending outwardly into proximity with the inner wall of said chamber, the inner circular wall of said chamber having a slot therein, glass mold supports on the ends of said arms and extending horizontally through said slot into the interior of said chamber for supporting a plurality of circumferentially spaced individual glass bending molds adapted to carry a sheet of glass into, through and out of said chamber with the glass sheet lying generally horizontal, a blast head located at the exit end of said heating chamber, said blast head having vertically spaced means for directing jets of air against the upper and lower surfaces of a bent sheet of glass on one of said molds, the space between said jet means being fixed and open at at least one side of said blast head at the level of said mold supports and molds, drive mechanism for intermittently rotating said spider and mechanism for radially moving said blast head out of the path of said molds before movement to said spider and into embracing position relative to a glass mold after movement of said spider has terminated.

2. Apparatus according to claim 1 and an air conduit system comprising a pair of open ended conduits vertically spaced and having open ends that are directed toward each other, upwardly and downwardly, respectively, at a distance such as to embrace the bottom and top of said blast head in its mold enclosing position.

3. Apparatus according to claim 1 and additional mechanism connected to said blast head for reciprocating said blast head relative to a bent glass sheet on a mold in the space between said jet means and generally radially relative to the spider when said blast head is in its mold enclosing position.

4. Apparatus according to claim 2 and air sealing means comprising flaps hinged along lines extending around the margins of said conduit ends and the top and bottom, respectively, of said blast head when said blast head is in its mold enclosing position, said flaps being urged by flow of air out of said conduit ends into contact with the top and bottom of said blast head.

5. An automatic glass bending and tempering furnace according to claim 1 and in which each of said molds has a center and two wings that are swingably mounted relative to said center for bending the ends of a sheet of glass and being adapted to carry a sheet of glass into, through and out of said chamber with the glass sheet lying generally horizontal and its length extending generally circumferentially of said chamber, and means for swinging said wings of each of said glass molds upwardly relative to the center thereof as a sheet of glass softens in said toroidal heating chamber, said means comprising a lever carried by the spider, a weight adjustably mounted on said lever for varying the force moment thereof, linkage connected to said mold wings, and connecting means extending radially outward from said lever through such slot in the inner wall of the chamber and connected to said linkage in general horizontal alignment with said mold.

6. An automatic glass bending and tempering furnace according to claim 5 in which said connecting means includes means for swinging each of said mold wing sections independently upwardly to a selected angle relative to said center section.

7. A glass bending and tempering furnace according to claim 5 in which each of the glass mold supports consists of a pair of outwardly extending bars extending beneath the ends of the mold center section and means for independently altering the angularity of each of said bars relative to horizontal to twist said mold center section.

8. A furnace according to claim 1 in which the blast head comprises a first group of nozzles directed toward one surface of the glass sheet and a second group of nozzles directed toward an opposite surface of the glass sheet, mounting means for rigidly supporting said first and second groups of nozzles in spaced relationship with the spacing therebetween substantially constant, means for supplying a fluid to each of said groups of nozzles, all of said nozzles having elongated slot openings of lengths substantially less than a dimension of said mounting means and extending angularly relative to the path of movement of said glass therebetween, the nozzles in each of said groups being arranged in staggered rows with the nozzles of one row overlapping the nozzles in an adjacent row, and said furnace has means for reciprocating said groups of nozzles across the surface of said glass sheet.

9. In an automatic glass bending and tempering furnace for glass sheets having lengths substantially greater than their widths, said furnace having a generally toroidal heating chamber extending less than 360°, with a plurality of differing temperature stations therein, the improvement comprising a centrally mounted, rotary spider having a plurality of radial arms extending outwardly into proximity with the inner wall of said chamber, the inner circular wall of said chamber having a slot therein, glass mold supports on the ends of said arms and extending horizontally through said slot into the interior of said chamber for supporting a plurality of circumferentially spaced individual glass molds, each of said molds having a main portion and two wings angularly movable relative thereto and being adapted to carry a sheet of glass into, through and out of said chamber with the glass sheet lying generally horizontal and its greater dimension extending generally circumferentially of said chamber, mechanism carried by said spider and extending inwardly through said slot for urging said mold wings upwardly, a blast head located at the exit end of said heating chamber, said blast head having vertically spaced means for directing jets of air against the upper and lower surfaces of a bent sheet of glass on one of said molds, the space between said jet means being open at the inner side of said blast head at the level of said mold supports and molds, drive mechanism for intermittently rotating said spider and mechanism for moving said blast head outwardly beyond the path of said molds before movement of said spider and inwardly around a glass mold after movement of said spider has terminated, an air conduit system comprising a pair of open ended conduits vertically spaced and having the open ends thereof directed toward each other, upwardly and downwardly, respectively, at a distance such as to embrace the bottom and top of said blast head in its inner mold enclosing position, air sealing means extending around the margins of said conduit ends and the top and bottom, respectively, of said blast head when said blast head is in its inner mold enclosing position, said air sealing means comprising flaps hinged along lines generally normal to the direction of reciprocation of the blast head to the margins of the conduit ends, whereby flow of air out of said conduit ends urges said flaps into contact with the top and bottom, respectively, of said blast head.

References Cited in the file of this patent

UNITED STATES PATENTS

| | | |
|---|---|---|
| 1,809,534 | Tillyer | June 9, 1931 |
| 2,032,008 | Galey | Feb. 25, 1936 |
| 2,042,521 | Ford | June 2, 1936 |
| 2,160,065 | Ford | May 30, 1939 |
| 2,377,536 | Wisner | June 5, 1945 |
| 2,525,112 | Baker | Oct. 10, 1950 |
| 2,646,647 | Bamford et al. | July 28, 1953 |
| 2,680,936 | Grotefeld | June 15, 1954 |
| 2,766,555 | Jendrisak et al. | Oct. 16, 1956 |
| 2,848,845 | Doumont | Aug. 26, 1958 |
| 2,848,846 | Schnorr | Aug. 26, 1958 |
| 2,876,595 | Golightly et al. | Mar. 10, 1959 |
| 2,879,628 | Kucera | Mar. 31, 1959 |
| 2,881,565 | White | Apr. 14, 1959 |
| 2,917,871 | Atkeson | Dec. 22, 1959 |

FOREIGN PATENTS

| | | |
|---|---|---|
| 765,339 | France | Mar. 19, 1934 |

UNITED STATES PATENT OFFICE
CERTIFICATE OF CORRECTION

Patent No. 3,087,316                      April 30, 1963

Norman C. Nitschke et al.

It is hereby certified that error appears in the above numbered patent requiring correction and that the said Letters Patent should read as corrected below.

Column 2, line 47, for "zones I-IV" read -- zones I-VI --; column 11, line 51, for "neating" read -- heating --; line 59, for "to" read -- of --.

Signed and sealed this 3rd day of December 1963.

(SEAL)
Attest:

ERNEST W. SWIDER

Attesting Officer

EDWIN L. REYNOLDS

Acting Commissioner of Patents